Sept. 3, 1957  E. C. DENCH  2,804,725
APPARATUS FOR PRECISION CONTOURING
Filed May 17, 1954  2 Sheets-Sheet 1
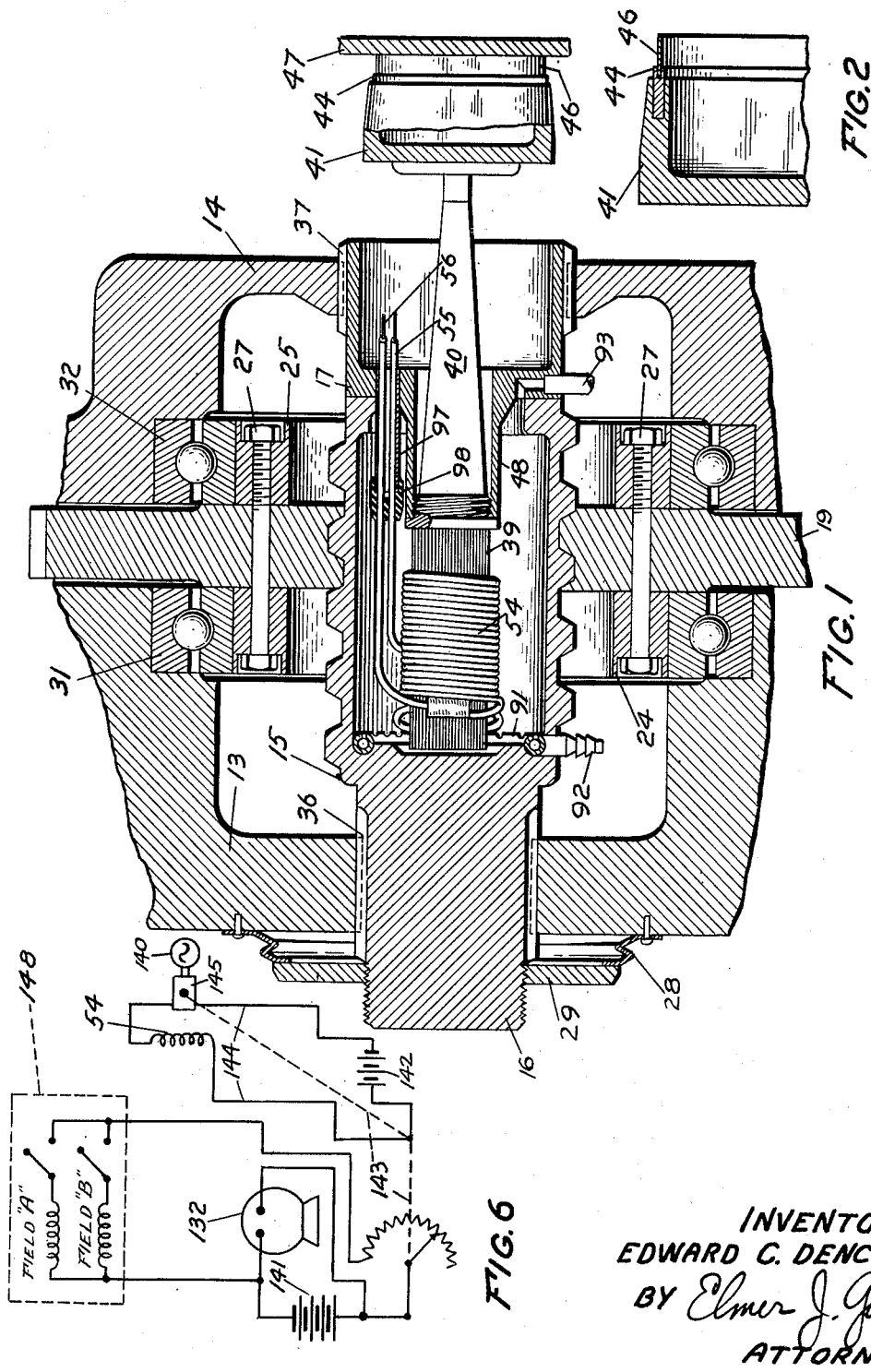
INVENTOR
EDWARD C. DENCH
BY Elmer J. Gorn
ATTORNEY Sept. 3, 1957  E. C. DENCH  2,804,725
APPARATUS FOR PRECISION CONTOURING
Filed May 17, 1954  2 Sheets-Sheet 2
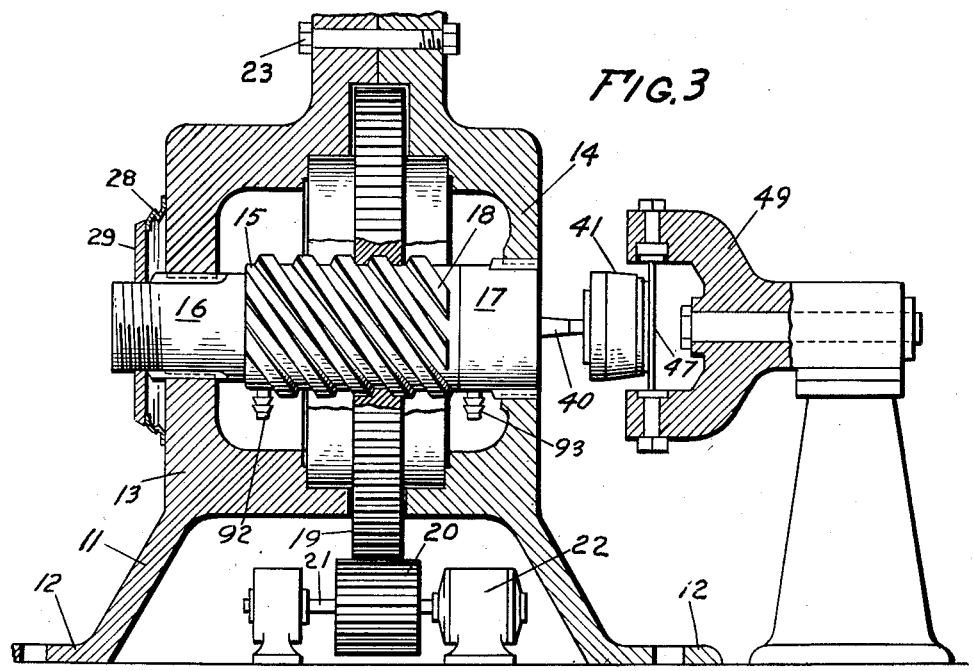
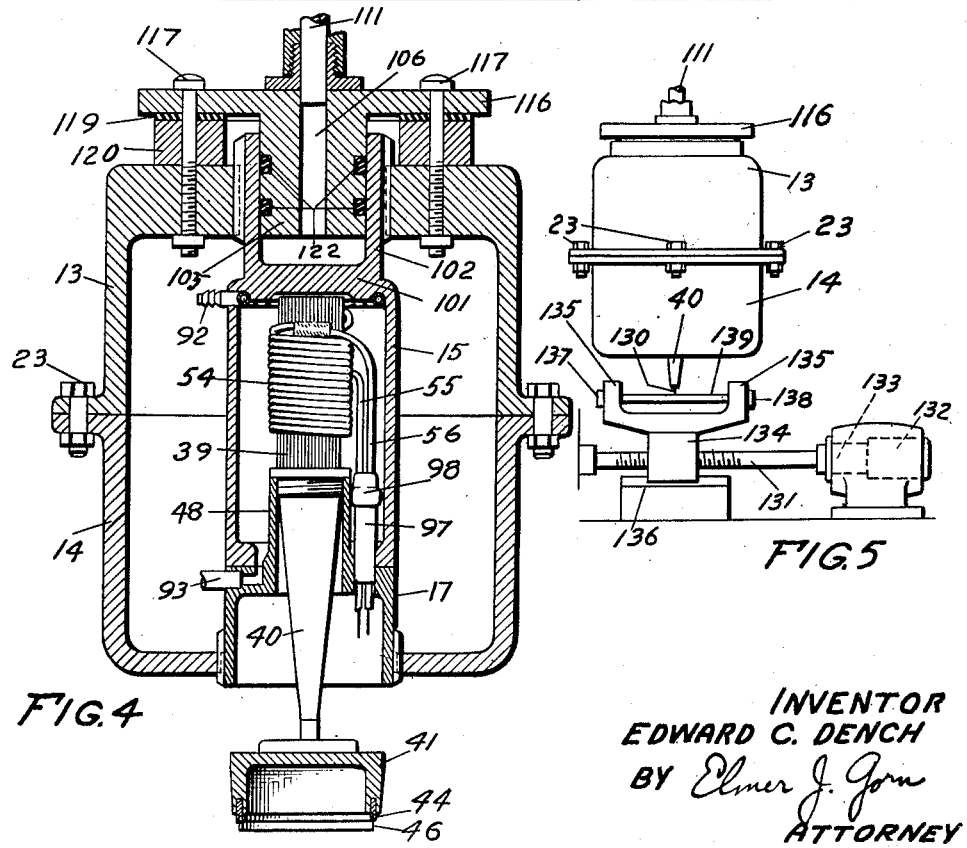
INVENTOR
EDWARD C. DENCH
BY Elmer J. Gorn
ATTORNEY United States Patent Office 2,804,725
Patented Sept. 3, 1957

2,804,725
APPARATUS FOR PRECISION CONTOURING

Edward C. Dench, Needham, Mass., assignor to Raytheon Manufacturing Company, Waltham, Mass., a corporation of Delaware Application May 17, 1954, Serial No. 430,151

12 Claims. (Cl. 51—64)

This invention relates to contouring, and particularly to fashioning hard or brittle material into desired shapes, for performance of special functions as, for example, the function of insulating the cathode element in a radiant energy transmitter, such as a magnetron or the like.

The invention is characterized by the utilization of a vibratory shaping tool and the activation of such tool in a manner to cause it to make an extremely great number of cutting strokes per second, with the impact force of successive cutting strokes being maintained at a relatively constant value, thus minimizing the risk of creating a fracturing or shearing stress within the material being worked upon.

By causing the cutting impacts to occur at constant force, and at a frequency of many thousands of impacts per second, the present invention makes it possible to cut through a hard or brittle piece of considerable thickness in a very few minutes and thus exceed the production rate of prior cutting methods while eliminating virtually all of the breakage risk inherent in the former methods.

The invention includes the application of an electromagnetic field to a magnetostrictive element having a cutting or shaping tool integrated therewith, to produce high frequency oscillation of the tool, and the feeding of such tool into the workpiece as the cutting or shaping operation proceeds. In two of the embodiments herein illustrated, the entire contour to be produced is incorporated in the cutting edge of the tool, so that there is no necessity to move the workpiece during the contouring operation. In a third illustrated embodiment, the workpiece undergoes continuous motion during the contouring operation. In all three embodiments, the tool is fed into the workpiece progressively as the contouring operation proceeds. In one embodiment the feeding is controlled electrically; in another, it is controlled by fluid pressure.

In the machining of relatively hard materials, the use of rapidly vibrated cutting tools has become increasingly popular. Primarily, the employment of extremely high oscillation frequencies makes it possible to achieve a substantial cutting effect with the application of precisely controlled impact force for each cycle of engagement of the tool with the material, thereby reducing greatly the likelihood of damage to the material, such as is more readily caused when the force applied is variable. This is particularly true where the material being worked is of a highly brittle character, as, for example, glass, porcelain, or other ceramic. On the other hand, if the attainment of the high frequency rate of oscillation is achieved by the employment of electromagnetic elements cooperating with magnetostrictive materials, there is an inherent limitation upon the amount of electromotive force that can be introduced into the device and, hence, a corresponding limitation upon the degree of impact force which can be developed. For this reason, such tools have up to the present time been somewhat limited in their application and, accordingly, it has been impracticable to apply such high frequency drilling or cutting methods except where the character of the opening or groove or other configuration to be formed has been such that its total cross-sectional area was relatively small.

The present invention makes it possible to apply electromagnetically driven high frequency vibratory tools to drilling or cutting operations wherein the article to be formed or fashioned out of a piece of relatively hard material has a total cross-sectional area many times larger than that which has been obtainable by the methods heretofore available. In this connection, a feature of the invention is the use of a tool having its cutting edge in the form of a circle or other closed loop corresponding in contour to the contour of the article to be fashioned out of a piece of stock, and with the transverse thickness of the cutting edge reduced to an extremely fine dimension, such as that commonly employed in cutting operations utilizing diamond-tipped tools. With such an arrangement, it is possible to fashion out of a piece of relatively hard material an article having a total cross-sectional area of many square inches, for example, by the use of the same type of electromagnetic vibratory driving means heretofore limited to the formation of slots, recesses, or other openings of a maximum cross-sectional area of only a few square centimeters at the most.

These and other characteristics of the invention will become apparent as the description thereof progresses, reference being had to the accompanying drawings wherein:

Fig. 1 illustrates apparatus constituting one embodiment of the invention;

Fig. 2 is an enlarged view of a fragment of the Fig. 1 assembly;

Fig. 3 illustrates a motor drive for the feeding of the tool assembly of Fig. 1;

Fig. 4 shows a second embodiment;

Fig. 5 shows a third embodiment; and

Fig. 6 shows electrical connections applicable to the embodiment of Fig. 5.

In Fig. 1 there is disclosed a machine suitable for practice of the invention, particularly in those situations wherein it is deemed desirable to have the fashioning tool operate along a horizontal axis, with the workpiece being held in a chuck or vise permitting the workpiece to be positioned along the same horizontal axis. As illustrated in Fig. 3, the machine includes a supporting frame 11 resting upon base flanges 12 and having complementary sections 13 and 14 secured to each other by bolts 23 and adapted to receive the corresponding end sections 16 and 17 of an elongated tool holding cylinder 15 having longlead threads 18 disposed along the exterior surface for interengagment with corresponding threads formed internally of a centrally disposed gear 19 adapted to be rotated by a pinion 20 carried on a shaft 21 forming an extension of the armature shaft of a torque motor 22 more fully described hereinafter. The gear 19 (see Fig. 1) is shown as provided with supporting rings 24 and 25 suitably secured to the gear 19 as, for example, by the use of through-bolts 27. These rings 24 and 25 are, in turn, rotatably supported upon ball-bearing assemblies 31 and 32 retained in suitable circular recesses formed in the elements 13 and 14, respectively. These elements 13 and 14 of the frame are splined, as indicated at 36 and 37, respectively, for cooperation with corresponding splines formed upon the outer portion 16 of the tool housing 15, these splines permitting longitudinal feeding of the tool housing 15, and the tool itself, while at the same time holding the tool housing and to tool against any rotation or transverse angular shifting with respect to the supporting frame. A flexible cover 28 attaches to a nut 29 threaded to the end portion 16, to protect the splines.

The action of motor 22 in continuously applying constant turning effort upon gear 19 (which gear is, in effect, a lead screw) is translated into constant axially directed feeding pressure applied to the tool housing 15—hence constant tool impact force.

The tool proper is shown in Figs. 1 and 2 as including a supporting ring 41 adapted for quick attachment to the forward end of a tool actuator 40, an intermediate ring 44 set into a circular recess formed in the forward face of the ring 41, and a cutting ring 46 having imbedded therein a multiplicity of diamond points or equivalent means forming a cutting edge for contact with the workpiece 47 mounted in the supporting chuck 49. It will be understood that the cutting ring 46 is mounted within the ring 44 in such a manner as to present a thin circular line of contact with the workpiece 47, with the thickness of the cutting edge thus formed being confined to the smallest physical dimension compatible with the impact absorbing capacity of the material chosen for the purpose. If necessary or desirable, the cutting action of the ring 46 may be supplemented by the introduction of abrasive material entrained in a liquid stream supplied along the cutting area by means of a suitable feed conduit and nozzle, not shown, in conformity with a technique that is well known in the art. The tool housing 15 is provided with an inwardly directed boss 48 having engagement with the tool driving asesmbly at an antinode along the longitudinal axis of the assembly, which assembly is illustrated as taking a form corresponding to that illustrated in Fig. 1 of United States Patent No. 2,632,858, issued to Carlo L. Calosi on March 24, 1953.

As in said Calosi patent, the driving means includes a tapered actuator, or oscillation transmitter 40, and a magnetostrictive driver 39 in the form of a stack of thin laminae of nickel surrounded by coils 54 whose inner ends are interconnected, and whose outer ends are extended, in the form of leads 55 and 56, to a current source to be further described. The laminae 39 undergo alternate expansions and contractions when suitably energized with polarizing direct current, combined with alternating current of the proper frequency. The driving means 39 operates at its natural frequency with considerable force and sets the vibratory element 40 into vibration. Conveniently, the driving means 39 may have a length substantially equal to one-half a wave length therein of oscillations at the operating frequency, while the vibratory element 40 may be any integral number of half wave lengths long, being illustrated herein as substantially one whole wave length. An antinode exists in this vibratory system at the region where the driving means 39 is joined to the vibratory element 40. The joining may be readily effected in any suitable manner, as by silver soldering the interfaces of the two parts, for example. Adjacent the antinodal plane of joinder, the drive transmitter 40 is externally threaded to receive the internally threaded end of a thin-walled cylindrical tube 48 of quater wave length, corresponding to the tube designated by numeral 15 in the Calosi patent above identified. As in said Calosi patent, the tube 48 terminates at its other end in a relatively massive ring 17 constituting, with its assocaited cylindrical housing element 15, a nonvibratory support corresponding to the nonvibratory supporting ring 17 of the Calosi patent, except that housing 15 is longitudinally movable.

For the reasons more fully explained in said Calosi patent, ring 17 absorbs no energy from the vibratory system, being connected thereto at the antinodal plane of joinder of parts 39 and 40.

Heat generated during energization of the magnetostrictive driver 39 is dissipated by cooling means (similar to that of the Calosi patent) in the form of a perforated tubular ring 91 supplied with cooling fluid under pressure by way of an inlet port 92 at one end of cylinder 15, there being an outlet passage 93 at the opposite end of the cylinder for removal of the fluid after it has been sprayed across the surfaces of the driver 39, the coils 54, and the tube 15 by the pressure acting thereon as the fluid emerges through the multiple openings 94 in the tubular ring 91.

The coils 54 are furnished with leads 55 and 56 which are brought through an opening in the end wall of cylinder 15. A rigid pipe 97 is affixed in this opening and extends part way into the housing 15. For the purpose of preventing water from leaking out through the pipe 97, a watertight cap 98 surrounds the leads 55 and 56, and seals off the inner end of the pipe.

Fig. 4 shows a second embodiment of the invention in which the cylinder 15 supporting the tool actuator 40 and the tool driving means 39 is adapted to be moved forward along its longitudinal axis by fluid pressure applied directly to the cylinder. In the form illustrated in Fig. 4, the cylinder is shown as provided with a transversely extending partition 101 intermediate its upper portion 102 and the body portion which surrounds the magnetostrictive driving means. The upper portion 102 is in the form of a cylindrical extension splined externally for engagement with the splines formed upon the stationary supporting section 13, while the inner cylindrical surface of this extension is smooth-bored to receive the correspondingly machined outer cylindrical surface of a cylindrical abutment element 105 which is in effect a stationary piston having a centrally formed passageway 106 permitting introduction of fluid under pressure from a suitable source (not shown). Such source may include suitable pumping mechanism feeding into a fluid conduit 111 leading to said central passageway 106. Fluid under pressure thus introduced into the space between the stationary piston abutment and the transverse partition will exert a constantly acting pressure along the longitudinal axis of the tool carrier and such pressure will operate to feed the tool forward into the material being worked upon. Suitable means are provided for securing the stationary piston abutment 105 to the frame element 13. In the form illustrated in Fig. 4, such means includes a flange 116 and through-bolts 117 joining said flange to the frame section 13, there being suitable fluid-sealing spacing elements 119 and 120 interposed between the flange and the frame section, as indicated. To provide corresponding sealing means as between the stationary piston abutment and the cylindrical extension, one or more sealing rings 122 compressed within circumferential grooves in the piston may also be provided. In this form of the invention it will be noted that the entire outer surface of the main body portion of the cylinder may be smoothly contoured as there is no necessity for the exterior threads illustrated in the first form of the invention.

Fig. 5 illustrates another embodiment of the invention in which the cutting tool 130 has a solid cutting edge rather than a closed loop contour, as in the embodiments heretofore described, and the desired contour is formed in the workpiece by moving the latter transversely of the longitudinal axis of the cutting tool, the transversely moving means being illustrated as including a motion translating mechanism in the form of a lead-screw 131 rotated by an electric motor 132 through suitable gear reduction mechanism 133, and an internally threaded carriage 134 constrained by channel 136 to have rectilinear motion only. Carriage 134 has extending arms 135 constituting a chuck mechanism carrying radially movable workpiece engaging jaw elements 137 and 138 adapted to grip the workpiece 139 in the manner conventional in the art. The driving motor 132 may be energized from a suitable source of current 141 (see Fig. 6) and the speed of rotation of the motor may be regulated by a shunt field control mechanism 143 actuated by means 145 in circuit 144 connecting A. C. and D. C. sources 140 and 142, respectively, to coils 54 of the magneto-strictive driving means. Controller 145 operates to relate the speed of the motor to the frequency of oscillation of said magnetostrictive driving means, so that the lateral traverse of the workpiece 139 will be proportional to the frequency of vibration and, indirectly, to the rate of feed, of the tool. Also, if desired, the control circuit for the motor may include suitable rotation reversing means 148 in the form of oppositely wound shunt field windings alternately operable at adjustable time intervals to cause the workpiece to effect a plurality of cycles of transverse motion in alternate directions as the tool reaches the opposite extreme positions defining the limits of the slot or other opening being formed in the workpiece, it being understood that the tool will also be fed forward progressively deeper into the workpiece on each successive traverse. Of course, as an alternate procedure, the motor 132 may drive unidirectionally, with reversals of the carriage 134 being effected by suitable mechanical linkage of conventional motion-reversing design.

This invention is not limited to the particular details of construction, materials and processes described, as many equivalents will suggest themselves to those skilled in the art. It is, accordingly, desired that the appended claims be given a broad interpretation commensurate with the scope of the invention within the art.

What is claimed is:

1. In a cutting apparatus, a tool having a peripheral cutting edge of extreme thinness, said cutting edge forming a closed loop, means for vibrating said cutting edge at high frequency to cause said cutting edge to penetrate a piece of stock and thereby fashion out of said piece of stock an article having a contour conforming to that of said peripheral cutting edge, and means including inter-engaged long-lead helically threaded elements for exerting a constant feeding pressure upon said tool and thereby advancing said cutting edge through said piece of stock at a rate of advance which is proportional to the frequency of vibration.

2. In apparatus for establishing a desired contour in a piece of material, a workpiece supporting element, a tool supporting frame, a tool carrier having a hollow cylindrical extension externally splined for sliding support within said frame, said tool carrier including magnetostrictive driving means for causing said tool carrier to vibrate at high frequency along an axis normal to the plane of said workpiece, means operatively connected with said workpiece supporting element to cause said element to occupy progressively varying positions along the surface of said workpiece during operation of said magnetostrictive driving means, and means coacting with said hollow cylindrical extension for directing tool-feeding pressure axially of said tool carrier to maintain said tool in engagement with said workpiece.

3. In apparatus for establishing a desired contour in a piece of material, a workpiece supporting element, a tool supporting frame, a tool carrier mounted in said frame, said tool carrier including magnetostrictive driving means for causing said tool carrier to vibrate at high frequency along an axis normal to the plane of said workpiece, and means operatively connected with said workpiece supporting element to cause said element to occupy progressively varying positions along the surface of said workpiece during operation of said magnetostrictive driving means, said last-named means comprising motion translating mechanism including a relatively slowly rotating element, and means for rotating said last-named element in synchronism with the operation of said magnetostrictive driving means, said last-named means comprising an electric motor for driving said motion translating mechanism, a motor-energizing circuit including a variable resistor therein, a second circuit including means controlling the operating frequency of said magnetostrictive driving means, and linkage connecting said frequency-controlling means with said variable resistor.

4. In apparatus for establishing a desired contour in a piece of material, a workpiece supporting element, a tool supporting frame, a tool carrier mounted in said frame, said tool carrier including magnetostrictive driving means for causing said tool carrier to vibrate at high frequency along an axis normal to the plane of said workpiece, and means operatively connected with said workpiece supporting element to cause said element to occupy progressively varying positions along the surface of said workpiece during operation of said magnetostrictive driving means, said last-named means including a prime mover drivably connected with said work supporting element to move the latter at a rate proportionate to the frequency of vibration of said tool carrier, and means for synchronizing the operation of said prime mover with the operation of said magnetostrictive driving means, said synchronizing means comprising a pair of inter-linked circuits, one of which constitutes energizing means for said magnetostrictive driving means, and the other of which constitutes energizing means for said prime mover.

5. In apparatus for forming an opening of a predetermined contour in a piece of material, in combination, a support for said piece of material, a tool engageable with the surface of said piece of material, magnetostrictive driving means for causing said tool to vibrate at high frequency along an axis common to said tool and magnetostrictive driving means, feeding means to cause said tool to penetrate progressively into said material, dynamo-electric means for shifting said material laterally of said axis, and means for synchronizing said shifting means with said feeding means, said synchronizing means comprising a pair of inter-linked circuits, one of which constitutes energizing means for said magnetostrictive driving means, and the other of which constitutes energizing means for said dynamo-electric means.

6. Apparatus for forming an opening of predetermined contour in a piece of material comprising, in combination, a tool engageable with said material, magnetostrictive driving means for operating said tool, means concentrically surrounding said driving means for supporting said driving means at a point of minimum vibratory amplitude, and means physically engaging said concentrically surrounding means to apply axially directed pressure continuously thereto for feeding said driving means and supporting means in a direction to cause said tool to penetrate progressively into said material.

7. Apparatus for forming an opening of predetermined contour in a piece of material comprising, in combination, a tool engageable with said material, magnetostrictive driving means for operating said tool, means concentrically surrounding said driving means for supporting said driving means at a point of minimum vibratory amplitude, means physically engaging said concentrically surrounding means to apply axially directed pressure continuously thereto for feeding said driving means and supporting means in a direction to cause said tool to penetrate progressively into said material, means for shifting said material laterally of said tool, and means for synchronizing the operation of said shifting means with that of said feeding means.

8. Apparatus for forming an opening of predetermined contour in a piece of material comprising, in combination, a tool engageable with said material, magnetostrictive driving means for operating said tool, means concentrically surrounding said driving means for supporting said driving means at a point of minimum vibratory amplitude, means physically engaging said concentrically surrounding means to apply axially directed pressure continuously thereto for feeding said driving means and supporting means in a direction to cause said tool to penetrate progressively into said material, means for shifting said material laterally of said tool, and means for synchronizing the operation of said shifting means with that of said driving means.

9. Apparatus for forming an opening of predetermined contour in a piece of material comprising, in combination, a tool engageable with said material, magnetostrictive driving means for operating said tool, means concentrically surrounding said driving means for supporting said driving means at a point of minimum vibratory amplitude, electrically-driven means physically engaging said concentrically surrounding means to apply axially directed pressure continuously thereto for feeding said driving means and supporting means in a direction to cause said tool to penetrate progressively into said material, means for shifting said material laterally of said tool, and means for synchronizing the operation of said shifting means with that of said feeding means.

10. Apparatus for forming an opening of predetermined contour in a piece of material comprising, in combination, a tool engageable with said material, magnetostrictive driving means for operating said tool, means for supporting said driving means at a point of minimum vibratory amplitude, said supporting means including a cylindrical extension coaxially aligned with said driving means, and fluid pressure operating means fitting operatively within said cylindrical extension for feeding said driving means and supporting means in a direction to cause said tool to penetrate progressively into said material.

11. In a cutting apparatus, a penetrating tool having a magnetostrictive rod integrated therewith, carrier means operatively connected with said rod and tool to impart longitudinal feeding motion thereto in response to longitudinal motion of said carrier means, electrically driven motion-translating means concentrically surrounding said carrier means and operative to apply constant effort thereto for causing longitudinal motion of said carrier means, and electromagnetic means for imparting a high rate of vibration to said magnetostrictive rod to cause said penetrating tool to perform a cutting operation.

12. In a cutting apparatus, a penetrating tool having a magnetostrictive rod integrated therewith, carrier means operatively connected with said rod and tool to impart longitudinal feeding motion thereto in response to longitudinal motion of said carrier means, electrically driven motion translating means for causing longitudinal motion of said carrier means, said motion translating means including long-lead threads for maintaining constant impact force upon said tool, and electromagnetic means for imparting a high rate of vibration to said magnetostrictive rod to cause said penetrating tool to perform a cutting operation.

References Cited in the file of this patent

UNITED STATES PATENTS

| | | |
|---|---|---|
| 724,706 | Jones | Apr. 7, 1903 |
| 1,380,869 | Fay | June 7, 1921 |
| 1,626,033 | Furst | Apr. 26, 1927 |
| 1,882,906 | Renfer | Oct. 18, 1932 |
| 2,296,819 | Osgood | Sept. 22, 1942 |
| 2,320,874 | Lehmann | June 1, 1943 |
| 2,412,211 | Eichelman | Dec. 10, 1946 |
| 2,452,211 | Rosenthal | Oct. 26, 1948 |
| 2,580,716 | Balamuth | Jan. 1, 1952 |
| 2,632,858 | Calosi | Mar. 24, 1953 |
| 2,651,148 | Carwile | Sept. 8, 1953 |
| 2,670,446 | Turner | Feb. 23, 1954 |